(12) United States Patent
Fein et al.

(10) Patent No.: US 6,884,983 B2
(45) Date of Patent: Apr. 26, 2005

(54) IMAGING SYSTEM FOR EXAMINING BIOLOGICAL MATERIAL

(75) Inventors: Howard Fein, Richmond Heights, OH (US); Andrew G. Cartlidge, Palm Beach Gardens, FL (US)

(73) Assignees: Palantyr Research, LLC, Cleveland, OH (US); Angkor Technology, LLP, Cleveland, OH (US)

( * ) Notice: Subject to any disclaimer, the term of this patent is extended or adjusted under 35 U.S.C. 154(b) by 258 days.

(21) Appl. No.: 10/166,137

(22) Filed: Jun. 10, 2002

(65) Prior Publication Data

US 2003/0227612 A1 Dec. 11, 2003

(51) Int. Cl.[7] .............................................. H01L 27/00
(52) U.S. Cl. .................................... 250/208.1; 250/216
(58) Field of Search ........................... 250/208.1, 216, 250/201.3, 201.9, 252.1, 458.1, 550; 359/9, 15, 26, 299, 321, 385, 621, 622; 382/134, 210

(56) References Cited

U.S. PATENT DOCUMENTS

| | | | |
|---|---|---|---|
| 4,750,022 A | 6/1988 | Araki | 355/46 |
| 5,051,770 A | 9/1991 | Cornuejols | 354/432 |
| 5,559,629 A | 9/1996 | Sheets et al. | 359/364 |
| 5,876,327 A | * 3/1999 | Tsuyuki et al. | 600/112 |
| 6,005,916 A | 12/1999 | Johnson et al. | 378/87 |
| 6,008,945 A | 12/1999 | Fergason | 359/630 |
| 6,088,097 A | 7/2000 | Uhl | 356/318 |
| 6,096,510 A | 8/2000 | Hochman | 435/29 |
| 6,124,974 A | 9/2000 | Burger | 359/621 |
| 6,128,068 A | 10/2000 | Suzuki et al. | 355/53 |
| 6,146,897 A | 11/2000 | Cohenford et al. | 436/63 |
| 6,195,213 B1 | 2/2001 | Omura et al. | 359/727 |
| 6,319,682 B1 | 11/2001 | Hochman | 435/29 |
| 6,335,824 B1 | 1/2002 | Overbeck | 359/368 |
| 6,337,472 B1 | 1/2002 | Garner et al. | 250/201.3 |

OTHER PUBLICATIONS

Holst, Gerald C., "*Image Quality: Does Your Detector Match Your Optics? Understanding the term "resolution" for both optics and detectors provides a solid basis for designing imaging systems.*" Photonics Spectra, Jan. 1999, pp. 144–146.

Casasent, David, "*Performing Image Analysis With Optical Pattern Recognition,*" The Photonics Design and Applications Handbook, 1998, pp. 158–161.

Mukundakrishnan, Bharath, "*Design for Visually Servoed Microassembly,*" Advanced Microsystems Laboratory, Department of Mechanical Engineering, University of Minnesota 2000.

"*Using your microscope, high magnifications with an oil–immersion objective,*" http://www.fishdoc.co.uk/microscope/micro04.htm Jul. 9, 2001.

Melles Griot, Optical Systems, Machine Vision Product Guide, USA, 1998.

* cited by examiner

Primary Examiner—Thanh X. Luu
Assistant Examiner—Seung C. Sohn
(74) Attorney, Agent, or Firm—Amin & Turocy, LLP (57) ABSTRACT

Improved biological material imaging systems and related methods are provided by using an imaging system for imaging biological materials, the imaging system comprising a sensor having one or more receptors, and an image transfer medium to scale the one or more receptors to an object field of view.

31 Claims, 8 Drawing Sheets

IMAGING SYSTEM FOR EXAMINING BIOLOGICAL MATERIAL

FIELD OF THE INVENTION

The present invention generally relates to an imaging system for examining biological material and methods of examining biological material.

BACKGROUND OF THE INVENTION

Microscopes give us a large image of a tiny object. Greater magnification can be achieved if the light from an object is made to pass through two lenses compared to a simple microscope with one lens. A compound microscope has two or more converging lenses, placed in line with one another, so that both bend and refract the light in turn. The result is to produce an image that is magnified more than either lens could magnify alone. Light illuminating the object first passes through a short focal length lens or lens group, called the objective, and then travels on some distance before being passed through a longer focal length lens or lens group, called the eyepiece. A lens group is often simply referred to singularly as a lens. Usually these two lenses are held in paraxial relationship to one another, so that the axis of one lens is arranged to be in exactly the same as orientation as the axis of the second lens. It is the nature of the lenses, their properties, their relationship, and the relationship of the objective lens to the object that determines how a highly magnified image is produced in the eye of the observer.

The first lens or objective, is usually a small lens with a very small focal length. A specimen or object is placed in the path of a light source with sufficient intensity to illuminate as desired. The objective lens is then lowered until the specimen is very close to, but not quite at the focal point of the lens. Light leaving the specimen and passing through the objective lens produces a real, inverted and magnified image behind the lens, in the microscope at a point generally referred to as the intermediate image plane. The second lens or eyepiece, has a longer focal length and is placed in the microscope so that the image produced by the objective lens falls closer to the eyepiece than one focal length (that is, inside the focal point of the lens). The image from the objective lens now becomes the object for the eyepiece lens. As this object is inside one focal length, the second lens bends the light in such a way as to produce a second image that is virtual, inverted and magnified. This is the final image seen by the eye of the observer.

Alternatively, common infinity space or infinity corrected design microscopes employ objective lenses with infinite conjugate properties such that the light leaving the objective is not focused, but is a flux of parallel rays which move and do not converge until after passing through a tube lens where the projected image is then located at the focal point of the eyepiece for magnification and observation. Compound microscopes such as described herein are commonly employed to view biological material.

Many microscopes, such as the compound microscope described above, are designed to provide images of certain quality to the human eye through an eyepiece. Connecting a Machine Vision Sensor, such as a Charge Coupled Device (CCD) sensor, to the microscope so that an image may be viewed on a monitor presents difficulties. This is because the image quality provided by the sensor and viewed by a human eye decreases, as compared to an image viewed by a human eye directly through an eyepiece. As a result, conventional optical systems for examining biological material often require the careful attention of a technician monitoring the process through an eyepiece. Real time images via a monitor are of poor quality.

While a scanning electron microscope can provide highly magnified images of biological material, there are several limitations associated with scanning electron microscope images. For example, it is difficult to impossible to provide real time images of a biological material. Scanning electron microscopy is typically a destructive technique, preventing further use of the imaged sample. A scanning electron microscope is a large apparatus requiring dedicated facilities, and is not portable.

SUMMARY OF THE INVENTION

The imaging system and methods of the present invention enable at least one of finer and more precise biological material image sampling; greater working distances thereby not interfering with manipulation of biological material samples; closed circuit, web based, and remote monitoring of biological material imaging; and automated process control of biological material imaging systems and methods. For instance, using the biological material imaging system of the present invention enables the improved identification of cancerous cells in a tissue sample, the improved identification of an unknown pathogen from a powder, the improved classification of cells as normal or abnormal, and the improved diagnosis of diseases/illnesses.

DETAILED DESCRIPTION OF THE INVENTION

A novel imaging system that provides high effective resolved magnification and high spatial resolution among other features of biological material and methods are combined to provide improved biological material imaging systems and methods. The biological material imaging systems and methods of the present invention enable the production of improved images (higher effective magnification, improved resolution, improved depth of field, and the like) leading to the identification of biological materials as well as the classification of biological materials (for example as normal or abnormal).

According to one aspect of the present invention, a k-space filter is provided that can be configured from an image transfer medium such as optical media that correlates image sensor receptors to an object field of view. A variety of illumination sources can also be employed to achieve one or more operational goals and for versatility of application. The k-space design of the imaging system of the present invention promotes capture and analysis (e.g., automated and/or manual) of images having a high Field Of View (FOV) at substantially high Effective Resolved Magnification as compared to conventional biological material microscopes. This can include employing a small Numerical Aperture (NA) associated with lower magnification objective lenses to achieve very high Effective Resolved Magnification. As a consequence, images having a substantially large Depth Of Field (DOF) at very high Effective Resolved Magnification are also realized. The k-space design also facilitates employment of homogeneous illumination sources that are substantially insensitive to changes in position, thereby improving methods of examining biological material.

According to another aspect of the present invention, an objective lens to biological material sample or object distance (e.g., Working Distance) can be maintained in operation at low and high power effective resolved magnification imaging, wherein typical spacing can be achieved at about 0.1 mm or more and about 20 mm or less, as opposed to conventional microscopic systems which can require significantly smaller (as small as 0.01 mm) tissue sample to objective lens distances for comparable (e.g., similar order of magnitude) Effective Resolved Magnification values. In another embodiment, the Working Distance is about 0.5 mm or more and about 10 mm or less. It is to be appreciated that the present invention is not limited to operating at the above working distances. In many instances the above working distances are employed, however, in some instances, smaller or larger distances are employed. It is further noted that oil immersion or other Index of Refraction matching media or fluids for objective lenses are generally not required (e.g., substantially no improvement to be gained) at one or more effective image magnification levels of the present invention yet, still exceeding effective resolved magnification levels achievable in conventional biological material microscopic optical design variations including systems employing "infinity-corrected" objective lenses.

The k-space design of the biological material imaging system of the present invention defines that a small "Blur Circle" or diffraction limited point/spot at the object plane is determined by parameters of the design to match image sensor receptors or pixels with a substantially one-to-one correspondence by "unit-mapping" of object and image spaces for associated object and image fields. This enables the improved performance and capabilities of the present invention. One possible theory of the k-space design results from the mathematical concept that since the Fourier Transform of both an object and an image is formed in k-space (also called "reciprocal space"), the sensor should be mapped to the object plane in k-space via optical design techniques and component placement in accordance with the present invention. It is to be appreciated that a plurality of other transforms or models can be utilized to configure and/or select one or more components in accordance with the present invention. For example, wavelet transforms, LaPlace (s-transforms), z-transforms as well as other transforms can be similarly employed.

The k-space design methodology is unlike conventional biological material optical systems designed according to geometric, paraxial ray-trace and optimization theory, since the k-space optimization facilitates that the spectral components of the object (tissue sample) and the image are the same in k-space, and thus quantized. Therefore, there are substantially no inherent limitations imposed on a Modulation Transfer Function (MTF) describing contrast versus resolution and absolute spatial resolution in the present invention. Quantization, for example, in k-space yields a substantially unitary Modulation Transfer Function not realized by conventional systems. It is noted that high MTF, Spatial Resolution, and effective image magnification can be achieved with much lower magnification objective lenses with desirable lower Numerical Apertures (e.g., generally less than about 50× and at a numerical aperture generally less than about 0.7) through "unit-mapping" of projected pixels in an "Intrinsic Spatial Filter" provided by the k-space design.

If desired, "infinity-corrected" objectives can be employed with associated optical component and illumination, as well as spectrum varying components, polarization varying components, and/or contrast or phase varying components. These components can be included in an optical path-length between an objective and the image lens within an "infinity space". Optical system accessories and variations can thus be positioned as interchangeable modules in this geometry. The k-space design, in contrast to conventional biological material microscopic imagers that utilize "infinity-corrected" objectives, enables the maximum optimization of the infinity space geometry by the "unit-mapping" concept. This implies that there is generally no specific limit to the number of additional components that can be inserted in the "infinity space" geometry as in conventional biological material microscopic systems that typically specify no more than 2 additional components without optical correction.

The present invention also enables a "base-module" design that can be configured and reconfigured in operation for a plurality of different applications if necessary to employ either transmissive or reflected illumination, if desired. This includes substantially all typical machine vision illumination schemes (e.g., darkfield, brightfield, phase-contrast), and other microscopic transmissive techniques (Kohler, Abbe), in substantially any offset and can include Epi illumination. The systems of the present invention can be employed in a plurality of opto-mechanical designs that are robust since the k-space design is substantially not sensitive to environmental and mechanical vibration and thus generally does not require heavy structural mechanical design and isolation from vibration associated with conventional biological material microscopic imaging instruments. Other features can include digital image processing, if desired, along with storage (e.g., local database, image data transmissions to remote computers for storage/analysis) and display of the images produced in accordance with the present invention (e.g., computer display, printer, film, and other output media). Remote signal processing of image data can be provided, along with communication and display of the image data via associated data packets that are communicated over a network or other medium, for example.

Biological material includes microorganisms (organisms too small to be observed with the unaided eye) such as bacteria, virus, protozoans, fungi, and ciliates; cell material from organisms such cells (lysed, intracellular material, or whole cells), proteins, antibodies, lipids, and carbohydrates, tagged or untagged; and portions of organisms such as clumps of cells (tissue samples), blood, pupils, irises, finger tips, teeth, portions of the skin, hair, mucous membranes, bladder, breast, male/female reproductive system components, muscle, vascular components, central nervous system components, liver, bone, colon, pancreas, and the like. Since the biological material imaging system of the present invention can employ a relatively large working distance, portions of the human body may be directly examined without the need for removing a tissue sample.

Cells include human cells, non-human animal cells, plant cells, and synthetic/research cells. Cells include prokaryotic and eukaryotic cells. Cells may be healthy, cancerous, mutated, damaged, or diseased.

Examples of non-human cells include anthrax, *Actinomycetes* spp., *Azotobacter, Bacillus anthracis, Bacillus cereus, Bacteroides* species, *Bordetella pertussis, Borrelia burgdorferi, Campylobacter jejuni, Chlamydia* species, *Clostridium* species, *Cyanobacteria, Deinococcus radiodurans, Escherichia coli, Enterococcus, Haemophilus influenzae, Helicobacter pylori, Klebsiella pneumoniae, Lactobacillus* spp., *Lawsonia intracellularis, Legionellae, Listeria* spp., *Micrococcus* spp., *Mycobacterium leprae, Mycobacterium tuberculosis, Myxobacteria, Neisseria gonorrheoeae, Neisseria meningitidis, Prevotella* spp., *Pseudomonas* spp., *Salmonellae, Serratia marcescens, Shigella* species, *Staphylococcus aureus, Streptococci, Thiomargarita namibiensis, Treponema pallidum, Vibrio cholerae, Yersinia enterocolitica, Yersinia pestis*, and the like.

Additional examples of biological material are those that cause illness such as colds, infections, malaria, chlamydia, syphilis, gonorrhea, conjunctivitis, anthrax, meningitis, botulism, diarrhea, brucellosis, campylobacter, candidiasis, cholera, coccidioidomycosis, cryptococcosis, diphtheria, pneumonia, foodborne infections, glanders (burkholderia mallei), *influenzae*, leprosy, histoplasmosis, legionellosis, leptospirosis, listeriosis, melioidosis, nocardiosis, nontuberculosis *mycobacterium*, peptic ulcer disease, pertussis, pneumonia, psittacosis, *Salmonella* enteritidis, shigellosis, sporotrichosis, strep throat, toxic shock syndrome, trachoma, typhoid fever, urinary tract infections, lyme disease, and the like. As described later, the present invention further relates to methods of diagnosing any of the above illnesses.

Examples of human cells include fibroblast cells, skeletal muscle cells, neutrophil white blood cells, lymphocyte white blood cells, erythroblast red blood cells, osteoblast bone cells, chondrocyte cartilage cells, basophil white blood cells, eosinophil white blood cells, adipocyte fat cells, invertebrate neurons (Helix aspera), mammalian neurons, adrenomedullary cells, melanocytes, epithelial cells, endothelial cells; tumor cells of all types (particularly melanoma, myeloid leukemia, carcinomas of the lung, breast, ovaries, colon, kidney, prostate, pancreas and testes), cardiomyocytes, endothelial cells, epithelial cells, lymphocytes (T-cell and B cell), mast cells, eosinophils, vascular intimal cells, hepatocytes, leukocytes including mononuclear leukocytes, stem cells such as haemopoetic, neural, skin, lung, kidney, liver and myocyte stem cells, osteoclasts, chondrocytes and other connective tissue cells, keratinocytes, melanocytes, liver cells, kidney cells, and adipocytes. Examples of research cells include transformed cells, Jurkat T cells, NIH3T3 cells, CHO, COS, etc.

A useful source of cell lines and other biological material may be found in ATCC Cell Lines and Hybridomas, Bacteria and Bacteriophages, Yeast, Mycology and Botany, and Protists: Algae and Protozoa, and others available from American Type Culture Co. (Rockville, Md.), all of which are herein incorporated by reference. These are non-limiting examples as a litany of cells and other biological material can be listed.

The identification or classification of biological material can in some instances lead to the diagnosis of disease. Thus, the present invention also provides improved systems and methods of diagnosis. For example, the present invention also provides methods for detection and characterization of medical pathologies such as cancer, pathologies of musculoskeletal systems, digestive systems, reproductive systems, and the alimentary canal, in addition to atherosclerosis, angiogenesis, arteriosclerosis, inflamation, atherosclerotic heart disease, myocardial infarction, trauma to arterial or veinal walls, neurodegenerative disorders, and cardiopulmonary disorders. The present invention also provides methods for detection and characterization of viral and bacterial infections. The present invention also enables assessing the effects of various agents or physiological activities on biological materials, in both in vitro and in vivo systems. For example, the present invention enables assessment of the effect of a physiological agent, such as a drug, on a population of cells or tissue grown in culture.

Figure 1:
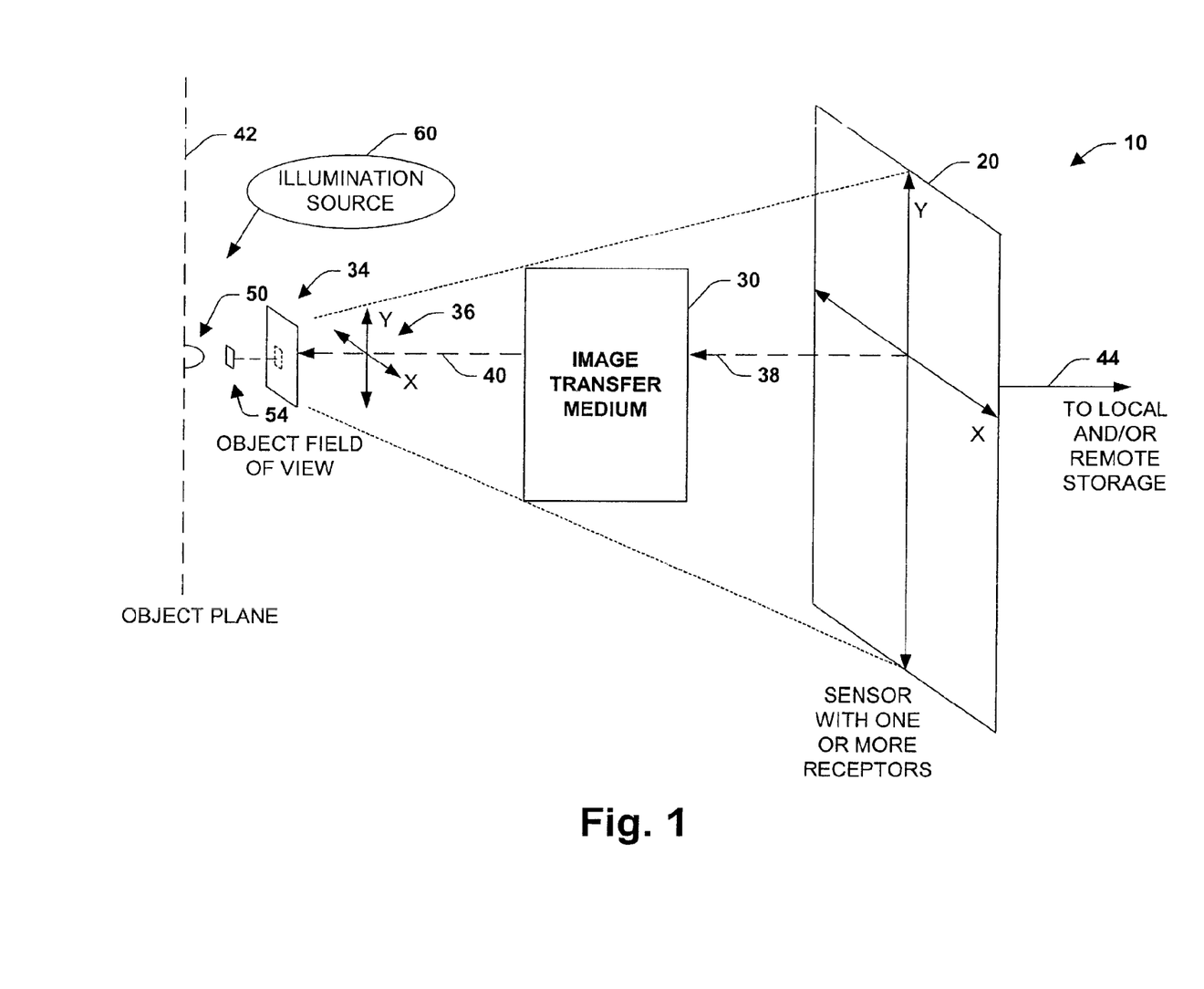
FIG. 1 is a schematic block diagram illustrating a biological material imaging system in accordance with an aspect of the present invention.

Referring initially to FIG. 1, a biological material imaging system 10 is illustrated in accordance with an aspect of the present invention. The imaging system 10 includes a sensor 20 having one or more receptors such as pixels or discrete light detectors (See e.g., illustrated below in FIG. 3) operably associated with an image transfer medium 30. The image transfer medium 30 is adapted or configured to scale the proportions of the sensor 20 at an image plane established by the position of the sensor 20 to an object field of view illustrated at reference numeral 34. A planar reference 36 of X and Y coordinates is provided to illustrate the scaling or reduction of the apparent or virtual size of the sensor 20 to the object field of view 34. Direction arrows 38 and 40 illustrate the direction of reduction of the apparent size of the sensor 20 toward the object field of view 34.

The object field of view 34 established by the image transfer medium 30 is related to the position of an object plane 42 that includes one or more biological material samples (not shown). It is noted that the sensor 20 can be substantially any size, shape and/or technology (e.g., digital sensor, analog sensor, CCD sensor, CMOS sensor, Charge Injection Device (CID) sensor, an array sensor, a linear scan sensor) including one or more receptors of various sizes and shapes, the one or more receptors being similarly sized or proportioned on a respective sensor to be responsive to light (e.g., visible, non-visible) received from the items under examination in the object field of view 34. As light is received from the object field of view 34, the sensor 20 provides an output 44 that can be directed to a local or remote storage such as a memory (not shown) and displayed from the memory via a computer and associated display, for example, without substantially any intervening digital processing (e.g., straight bit map from sensor memory to display), if desired. It is noted that local or remote signal processing of the image data received from the sensor 20 can also occur. For example, the output 44 can be converted to electronic data packets and transmitted to a remote system over a network for further analysis and/or display. Similarly, the output 44 can be stored in a local computer memory before being transmitted to a subsequent computing system for further analysis and/or display.

The scaling provided by the image transfer medium 30 is determined by a novel k-space configuration or design within the medium that promotes predetermined k-space frequencies of interest and mitigates frequencies outside the predetermined frequencies. This has the effect of a band-pass filter of the spatial frequencies within the image transfer medium 30 and notably defines the biological material imaging system 10 in terms of resolution rather than magnification. As will be described in more detail below, the resolution of the imaging system 10 determined by the k-space design promotes a plurality of features in a displayed or stored image such as having high effective resolved magnification, high spatial resolution, large depth of field, larger working distances, and a unitary Modulation Transfer Function as well as other features that facilitate methods for examining biological material.

In order to determine the k-space frequencies, a "pitch" or spacing is determined between adjacent receptors on the sensor 20, the pitch related to the center-to-center distance of adjacent receptors and about the size or diameter of a single receptor. The pitch of the sensor 20 defines the Nyquist "cut-off" frequency band of the sensor. It is this frequency band that is promoted by the k-space design, whereas other frequencies are mitigated. In order to illustrate how scaling is determined in the imaging system 10, a small or diffraction limited spot or point 50 is illustrated at the object plane 42. The diffraction limited point 50 represents the smallest resolvable object determined by optical characteristics within the image transfer medium 30 and is described in more detail below. A scaled receptor 54, depicted in front of the field of view 34 for exemplary purposes, and having a size determined according to the pitch of the sensor 20, is matched or scaled to be about the same size in the object field of view 34 as the diffraction limited point 50.

In other words, the size of any given receptor at the sensor 20 is effectively reduced in size via the image transfer medium 30 to be about the same size (or matched in size) to the size of the diffraction limited point 50. This also has the effect of filling the object field of view 34 with substantially all of the receptors of the sensor 20, the respective receptors being suitably scaled to be similar in size to the diffraction limited point 50. As will be described in more detail below, the matching/mapping of sensor characteristics to the smallest resolvable object or point within the object field of view 34 defines the imaging system 10 in terms of absolute spatial resolution and profoundly enhances the operating performance of the system.

An illumination source 60 can be provided with the present invention in order that photons can be emitted from objects in the field of view 34 to enable activation of the receptors in the sensor 20. It is noted that the present invention can potentially be employed without an illumination source 60 if potential self-luminous objects (e.g., fluorescent biological material sample) emit enough radiation to activate the sensor 60. Light Emitting Diodes, however, provide an effective illumination source 60 in accordance with the present invention. Substantially any illumination source 60 can be applied including coherent and non-coherent sources, visible and non-visible wavelengths. However, for non-visible wavelength sources, the sensor 20 would also be suitably adapted. For example, for an infrared or ultraviolet source, an infrared or ultraviolet sensor 20 would be employed, respectively. Other illumination sources 60 can include wavelength-specific lighting, broad-band lighting, continuous lighting, strobed lighting, Kohler illumination, Abbe illumination, phase-contrast illumination, darkfield illumination, brightfield illumination, and Epi illumination. Transmissive or reflective lighting techniques can also be applied.

Figure 2:
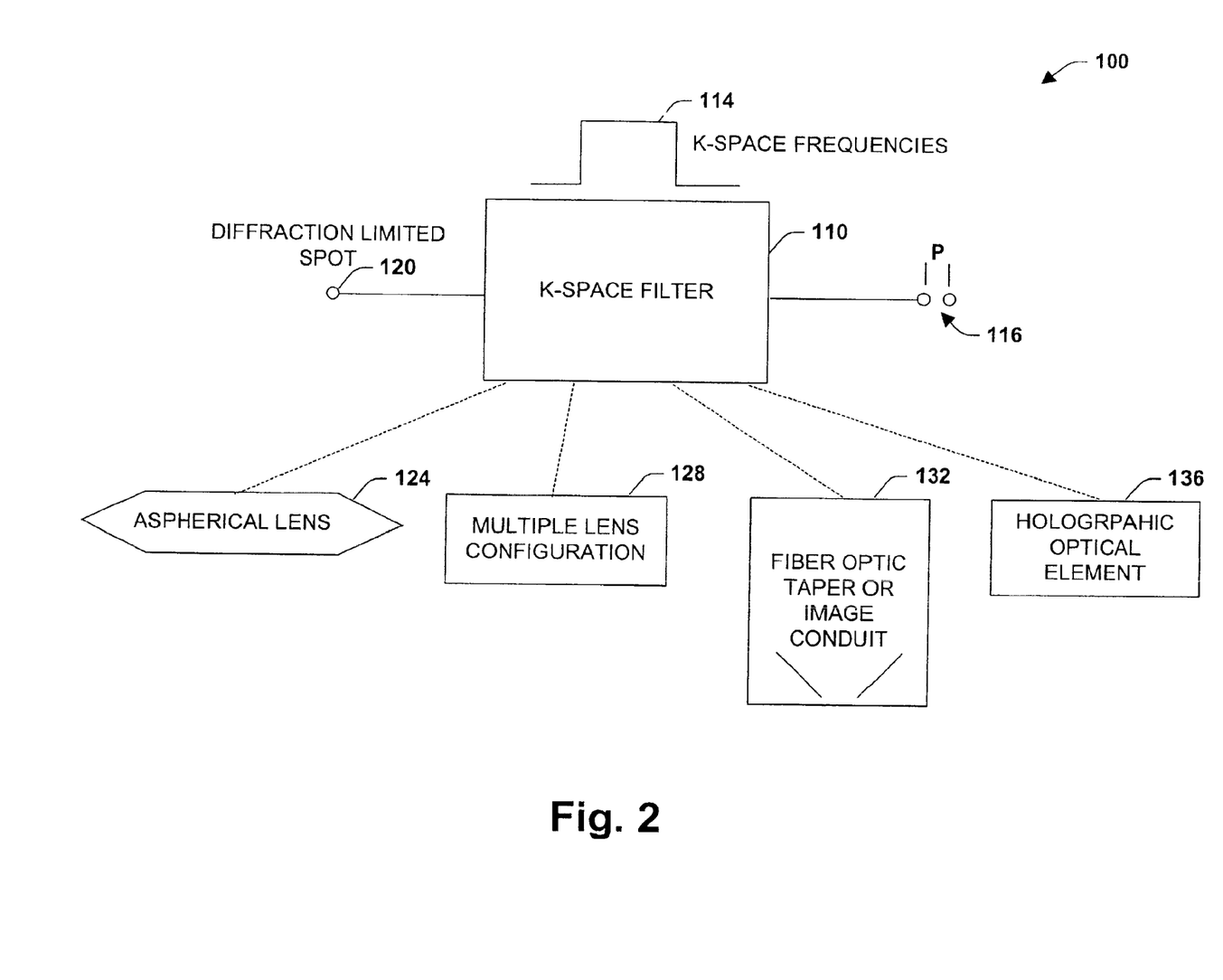
FIG. 2 is a diagram illustrating a k-space system design in accordance with an aspect of the present invention.

Referring now to FIG. 2, a system 100 illustrates an image transfer medium 30 in accordance with an aspect of the present invention. The image transfer medium 30 depicted in FIG. 1 can be provided according to the k-space design concepts described above and more particularly via a k-space filter 110 adapted, configured and/or selected to promote a band of predetermined k-space frequencies 114 and to mitigate frequencies outside of this band. This is achieved by determining a pitch "P"—which is the distance between adjacent receptors 116 in a sensor (not shown) and sizing optical media within the filter 110 such that the pitch "P" of the receptors 116 is matched in size with a diffraction-limited spot 120. The diffraction-limited spot 120 can be determined from the optical characteristics of the media in the filter 110. For example, the Numerical Aperture of an optical medium such as a lens defines the smallest object or spot that can be resolved by the lens. The filter 110 performs a k-space transformation such that the size of the pitch is effectively matched, "unit-mapped", projected, correlated, and/or reduced to the size or scale of the diffraction limited spot 120.

It is to be appreciated that a plurality of novel optical configurations can be provided to achieve the k-space filter 110. One such configuration can be provided by an aspherical lens 124 adapted such to perform the k-space transformation and reduction from sensor space to object space. Yet another configuration can be provided by a multiple lens arrangement 128, wherein the lens combination is selected to provide the filtering and scaling. Still yet another configuration can employ a fiber optic taper 132 or image conduit, wherein multiple optical fibers or array of fibers are configured in a funnel-shape to perform the mapping of the sensor to the object field of view. It is noted that the fiber optic taper 132 is generally in physical contact between the sensor and the object under examination (e.g., contact with microscope slide). Another possible k-space filter 110 arrangement employs a holographic or other diffractive or phase optical element 136, wherein a substantially flat optical surface is configured via a hologram or other diffractive or phase structure (e.g., computer-generated, optically generated, and/or other method) to provide the mapping in accordance with the present invention.

The k-space optical design as enabled by the k-space filter 110 is based upon the "effective projected pixel-pitch" of the sensor, which is a figure derived from following ("projecting") the physical size of the sensor array elements back through the optical system to the object plane. In this manner, conjugate planes and optical transform spaces are matched to the Nyquist cut-off of the effective receptor or pixel size. This maximizes the effective image magnification and the Field Of View as well as the Depth Of Field and the Absolute Spatial Resolution. Thus, a novel application of optical theory is provided that does not rely on conventional geometric optical design parameters of paraxial ray-tracing which govern conventional optics and imaging combinations. This can further be described in the following manner.

A Fourier transform of an object and an image is formed (by an optical system) in k-space (also referred to as "reciprocal-space"). It is this transform that is operated on for image optimization by the k-space design of the biological material imaging system of the present invention. For example, the optical media employed in the present invention can be designed with standard, relatively non-expensive "off-the-shelf" components having a configuration which defines that the object and image space are "unit-mapped" or "unit-matched" for substantially all image and object fields. A small Blur-circle or diffraction-limited spot 120 at the object plane is defined by the design to match the pixels in the image plane (e.g., at the image sensor of choice) with substantially one-to-one correspondence and thus the Fourier transforms of pixelated arrays can be matched. This implies that, optically by design, the Blur-circle is scaled to be about the same size as the receptor or pixel pitch. The biological material imaging system of the present invention is defined such that it constructs an Intrinsic Spatial Filter such as the k-space filter 110. Such a design definition and implementation enables the spectral components of both the object and the image in k-space to be about the same or quantized. This also defines that the Modulation Transfer Function (MTF) (the comparison of contrast to spatial resolution) of the sensor is matched to the MTF of the object Plane.

Figure 3:
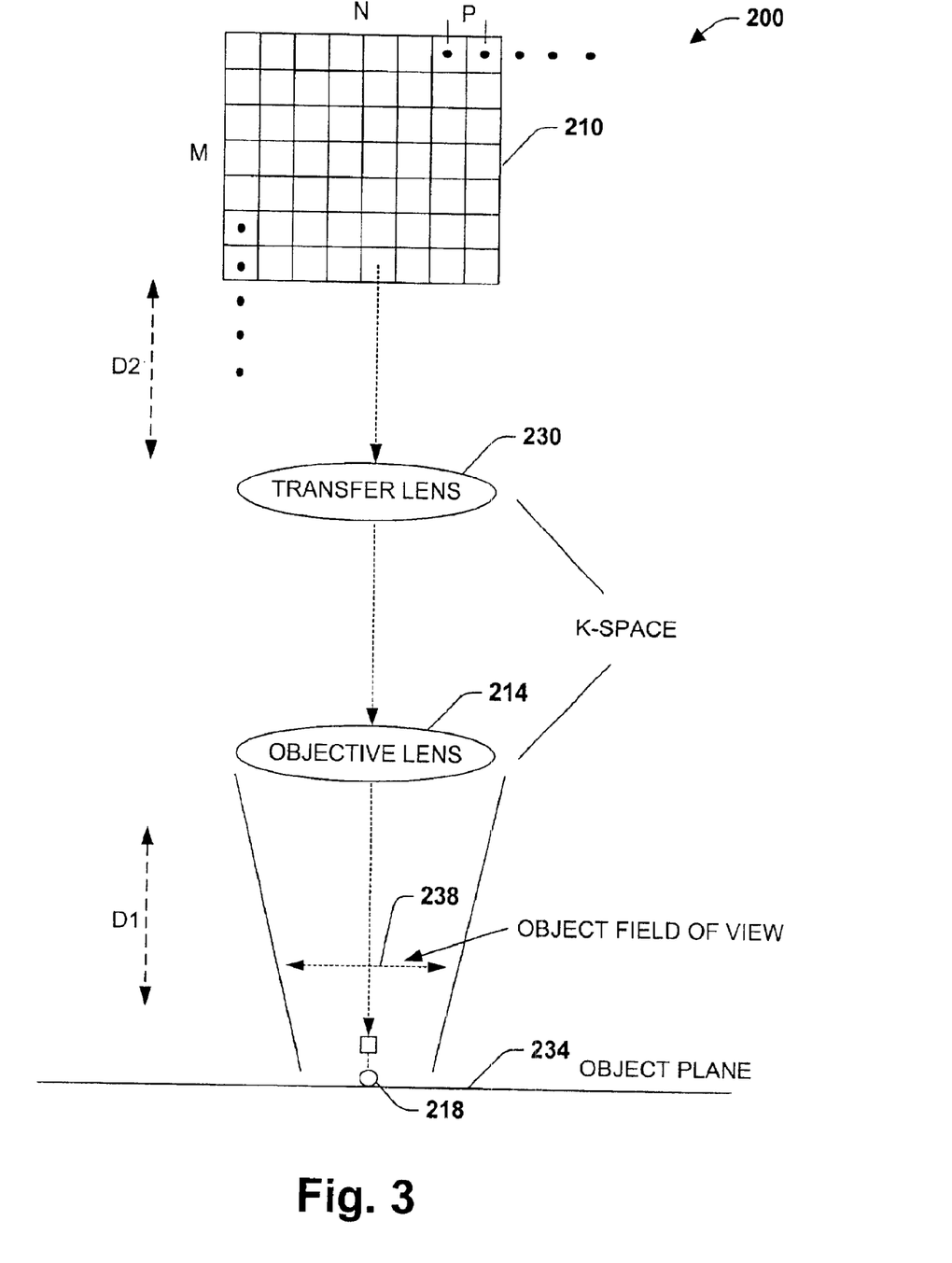
FIG. 3 is a diagram of an exemplary system illustrating sensor receptor matching in accordance with an aspect of the present invention.

Turning now to FIG. 3, a multiple lens system 200 illustrates an exemplary unit-mapping design in accordance with an aspect of the present invention. The system 200 includes an M by N array 210 of sensor pixels (e.g., 640×480, 512×512, 1024×1280, etc.), having M rows and N columns, M and N being integers respectively. Although a rectangular array 210 having square pixels is depicted, it is to be appreciated as noted above, the array 210 can be substantially any shape such as circular, elliptical, hexagonal, rectangular, etc. wherein respective pixels within the array 210 can also be substantially any shape or size, the pixels in any given array 210 being similarly sized and spaced. Unit-mapping can be determined for a plurality of sensors and lens combinations. For example, a substantially-wide diameter achromatic objective lens 214 (e.g., about 10 millimeters or more to about 100 millimeters or less in diameter) can be selected to preserve k-space frequencies of interest and having a Numerical Aperture capable of resolving diffraction-limited spots 218 of about 1 micron, for example, and having a focal length "D1" of about 1 centimeter. It is noted that the dimensions selected for the system 200 are provided for exemplary purposes to facilitate understanding of the concepts described above. Thus, for example, if an objective lens 214 is selected that is capable of resolving diffraction limited spots 218 having other dimensions (e.g., about 0.2, about 0.3, about 0.4, about 0.6 microns, etc.), then a different lens, sensor and/or lens/sensor combination is selected to provide the scaling and/or unit-mapping in accordance with the present invention.

In order to provide unit-mapping according to this example, and assuming for purposes of illustration that the sensor array 210 provides a pixel pitch "P" of about 10 microns, a relationship is to be determined between an achromatic transfer lens 230 and the objective lens 214 such that a reduction is achieved from sensor space defined at the array 210 to object space defined at an object plane 234 and thus, scaling respective pixels from the array 210 to about the size of the diffraction limited spot 218. It is noted that substantially all of the pixels are projected into an object field of view depicted at reference numeral 238 and defined by the objective lens 214, wherein respective pixels are sized to about the dimensions of the diffraction limited spot 218. The reduction in size of the array 210 and associated pixels can be achieved by selecting the transfer lens to have a focal length "D2" (from the array 210 to the transfer lens 230) of about 10 centimeters in this example. In this manner, the pixels in the array 210 are effectively reduced in size to about 1 micron per pixel, thus matching the size of the diffraction limited spot 218 and filling the object field of view 238 with a "virtually-reduced" array of pixels 210.

As illustrated in FIG. 3, k-space is defined as the region between the objective lens 214 and the transfer lens 230. It is to be appreciated that substantially any optical media, lens type and/or lens combination that reduces, maps and/or projects the sensor array 210 to the object field of view 238 in accordance with unit or k-space mapping as has been previously described is within the scope of the present invention. To illustrate the novelty of the exemplary lens/sensor combination depicted in FIG. 3, it is noted that conventional objective lenses for examining biological material, sized according to conventional geometric paraxial ray techniques, are generally sized according to the magnification, Numeric Aperture, focal length and other parameters provided by the objective. Thus, the objective lens would be sized with a greater focal length than subsequent lenses that approach or are closer to the sensor (or eyepiece in conventional microscope) in order to provide magnification of small objects. This can result in magnification of the small objects at the object plane being projected as a magnified image of the objects across "portions" of the sensor and results in known detail blur (e.g., Rayleigh diffraction and other limitations in the optics), empty magnification problems, and Nyquist aliasing among other problems at the sensor. The k-space design of the biological material imaging system of the present invention operates as an alternative to geometric paraxial ray design principles. As illustrated in FIG. 3, the objective lens 214 and the transfer lens 230 operate to provide a reduction in size of the sensor array 210 to the object field of view 238 as demonstrated by the relationship of the lenses.

Figure 4:
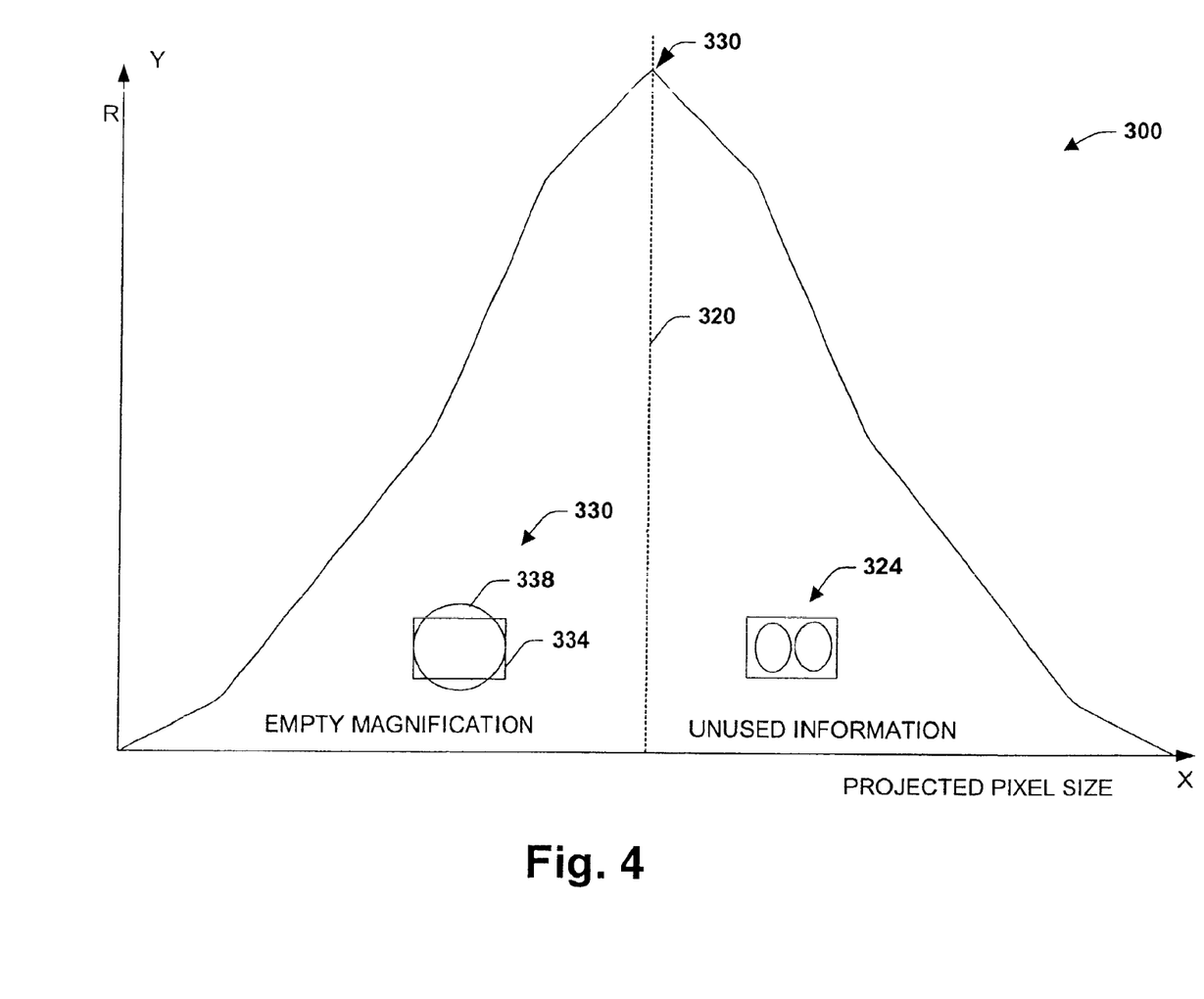
FIG. 4 is a graph illustrating sensor matching considerations in accordance with an aspect of the present invention.

Referring now to FIG. 4, a graph 300 illustrates mapping characteristics and comparison between projected pixel size on the X axis and diffraction-limited spot resolution size "R" on the Y axis. At the apex 310 of the graph 300, a unit mapping between projected pixel size and diffraction-limited spot size occurs which is the optimum relationship in accordance with the biological material imaging system of the present invention. It is noted that the objective lens 214 depicted in FIG. 3 need generally not be selected such that the diffraction-limited size "R" of the smallest resolvable objects is smaller than a projected pixel size. If so, "economic waste" can occur wherein more precise information is lost (e.g., selecting an object lens more expensive than required). This is illustrated to the right of a dividing line 320 at reference 324 depicting a projected pixel larger that two smaller diffraction spots. If an objective is selected with diffraction-limited performance larger than the projected pixel size, blurring and empty magnification can occur. This is illustrated to the left of line 320 at reference numeral 330, wherein a projected pixel 334 is smaller than a diffraction-limited object 338. It is to be appreciated, however, that even if substantially one-to-one correspondence is not achieved between projected pixel size and the diffraction-limited spot, a system can be configured with less than optimum matching (e.g., about 0.1% or more, about 1% or more, about 2% or more, about 5% or more, about 20% or more, about 95% or more down from the apex 330 on the graph 300 to the left or right of the line 320) and still provide suitable performance. Thus, less than optimal matching is intended to fall within the spirit and the scope of present invention. It is further noted that the diameter of the lenses in the system as illustrated in FIG. 3, for example, can be sized such that when a Fourier Transform is performed from object space to sensor space, spatial frequencies of interest that are in the band pass region described above (e.g., frequencies utilized to define the size and shape of a pixel) are substantially not attenuated. This generally implies that larger diameter lenses (e.g., about 10 to about 100 millimeters) are typically selected to mitigate attenuation of the spatial frequencies of interest.

Figure 5:
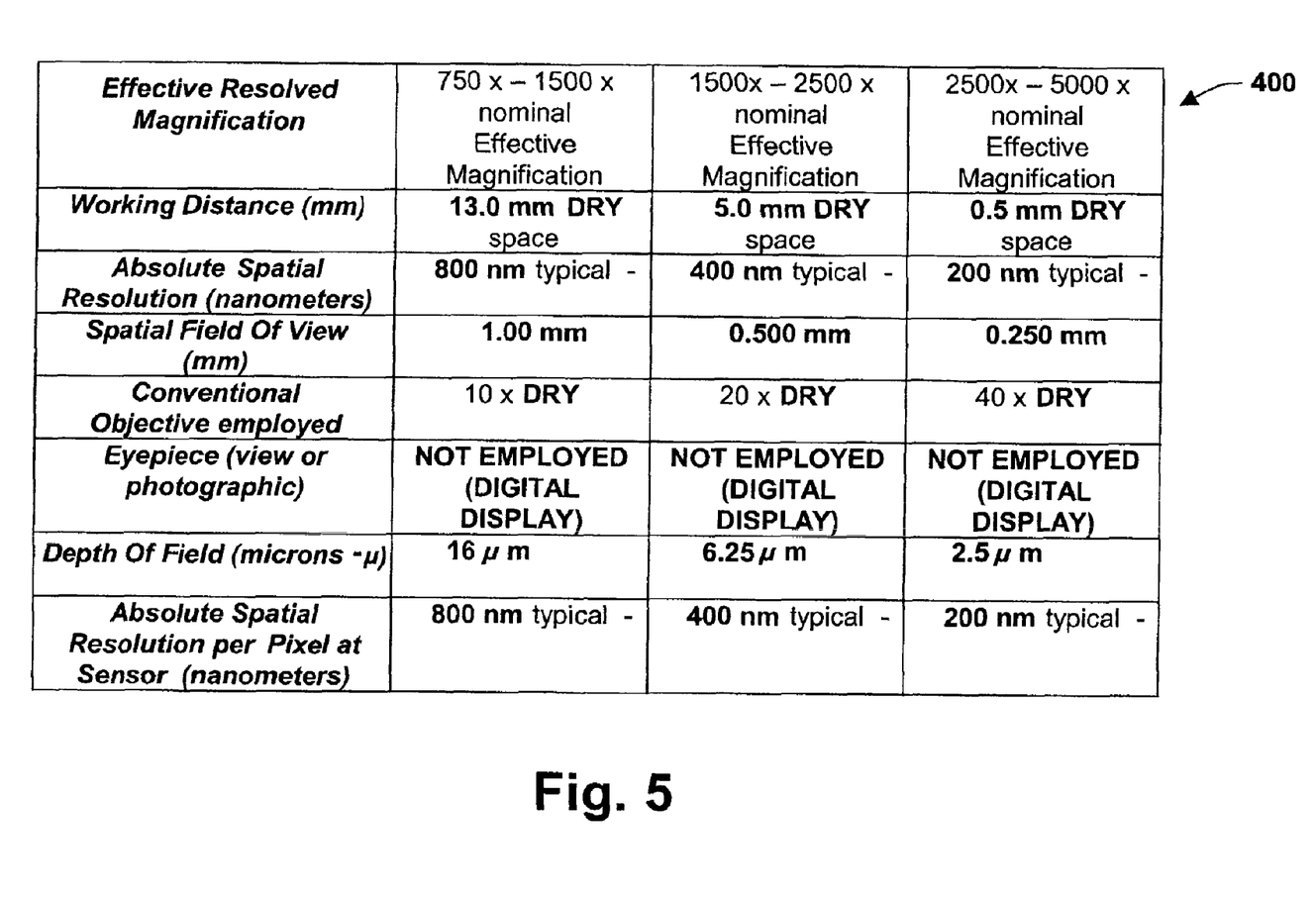
FIG. 5 is a chart illustrating exemplary performance specifications in accordance with an aspect of the present invention.

FIG. 5 illustrates a chart 400 of exemplary and typical performance parameters that can be achieved via the k-space design of the biological material imaging system of the present invention employing standard, low-cost, and commercially available components such as dry objective lenses, a 1024×1280 sensor, LED illumination source wavelengths selected at about twice the wavelength of the desired resolution (e.g., for 200 nanometer resolution, 400 nanometer light source selected), and a straight bit map from sensor to image display without intervening signal processing. Custom components can be alternatively fabricated. As can be observed, effective resolved magnifications of about 5000 times can be achieved at an absolute spatial resolution of about 200 nanometers in a typical non-optimized system. As used herein, the term "Effective Resolved Magnification" is utilized to objectively compare the relative apparent image size and Absolute Spatial Resolution of the biological material imaging system of the present invention with conventional biological material microscopic imaging systems.

In one embodiment, the images produced in accordance with the present invention have a depth of field of about 1 micron or more and about 50 microns or less at an Effective Resolved Magnification of about 750 times or more and about 5000 times or less. In another embodiment, the images produced in accordance with the present invention have a depth of field of about 10 microns or more and about 40 microns or less at an Effective Resolved Magnification of about 750 times or more and about 2500 times or less. In yet another embodiment, the images produced in accordance with the present invention have a depth of field of about 5 microns or more and about 50 microns or less at an Effective Resolved Magnification of about 400 times or more and about 2000 times or less.

In one embodiment, the images produced in accordance with the present invention have an effective resolved magnification of about 2500 times or more and about 5000 times or less while providing a spatial field of view of about 0.250 millimeters or less. In another embodiment, the images produced in accordance with the present invention have an effective resolved magnification of about 500 times or more and about 2500 times or less while providing a spatial field of view of about 0.2 millimeters or less.

Figure 6:
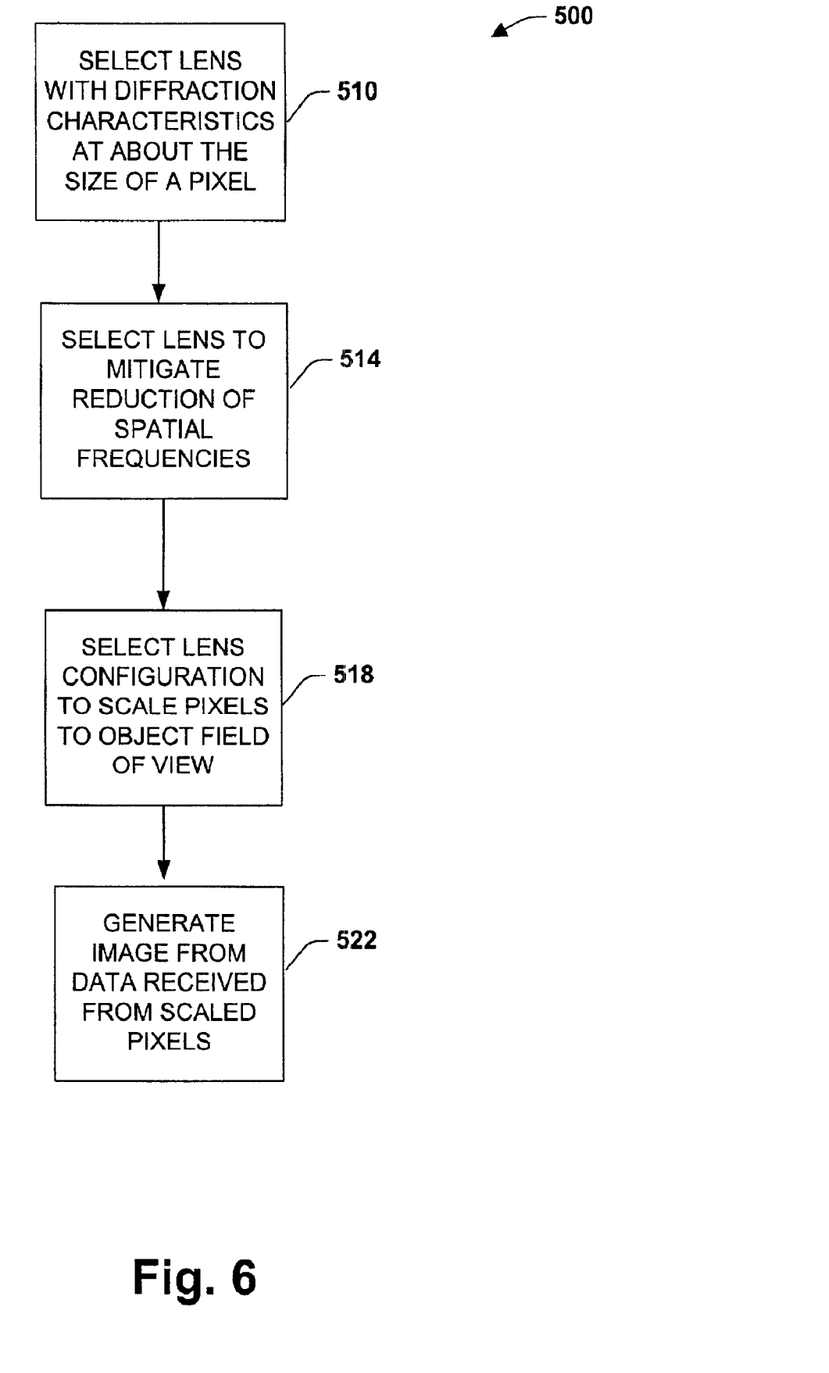
FIG. 6 is a flow diagram illustrating a biological material imaging methodology in accordance with an aspect of the present invention.

FIG. 6 illustrates a methodology 500 to facilitate biological material imaging performance in accordance with the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Proceeding to 510, lenses are selected having diffraction-limited characteristics at about the same size of a pixel in order to provide unit-mapping and optimization of the k-space design. At 514, lens characteristics are also selected to mitigate reduction of spatial frequencies within k-space. As described above, this generally implies that larger diameter optics are selected in order to mitigate attenuation of desired k-space frequencies of interest. At 518, a lens configuration is selected such that pixels, having a pitch "P", at the image plane defined by the position of a sensor are scaled according to the pitch to an object field of view at about the size of a diffraction-limited spot (e.g., unit-mapped) within the object field of view. At 522, an image is generated by outputting data from a sensor for real time monitoring and storing the data in memory for direct display to a computer display and/or subsequent local or remote image processing and/or analysis within the memory.

Figure 7:
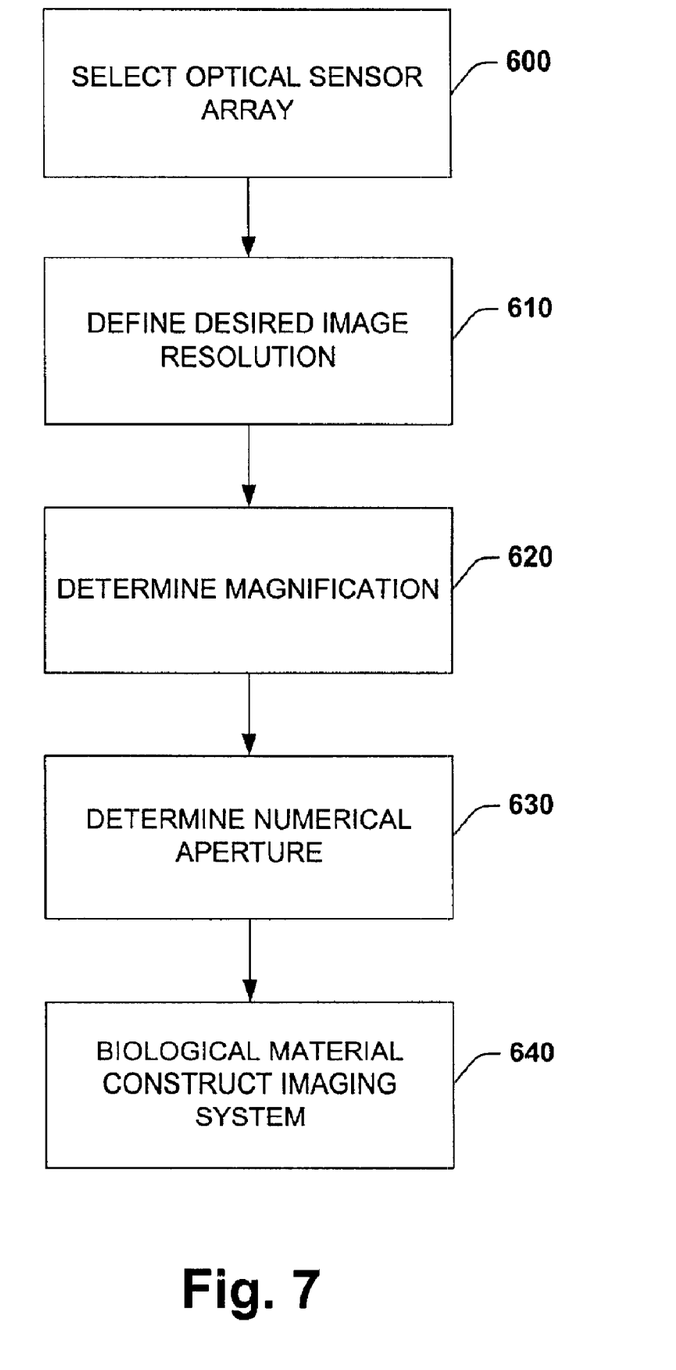
FIG. 7 is a flow diagram illustrating a biological material imaging methodology in accordance with one aspect of the present invention.

FIG. 7 illustrates another methodology that can be employed to design a biological material imaging system in accordance with an aspect of the present invention. The methodology begins at 600 in which an appropriate sensor array is chosen for the biological material imaging system. The sensor array includes of a matrix of receptor pixels having a known pitch size, usually defined by the manufacturer. The sensor can be substantially any shape (e.g., rectangular, circular, square, triangular, and so forth). By way of illustration, assume that a simple sensor of 640×480 pixels having a pitch size of 10 μm is chosen. It is to be understood and appreciated that a biological material imaging system can be designed for any type and/or size of sensor array in accordance with the present invention.

Next at 610, an image resolution is defined. The image resolution corresponds to the smallest desired resolvable spot size at the image plane. The image resolution can be defined based on the specific application(s) for which the biological material imaging system is being designed, such as any resolution that is greater than or equal to a smallest diffraction limited size. Thus, it is to be appreciated that resolution becomes a selectable design parameter that can be tailored to provide desired image resolution for virtually any type of application. In contrast, most conventional biological material imaging systems tend to limit resolution according to Rayleigh diffraction, which provides that intrinsic spatial resolution of the lenses cannot exceed limits of diffraction for a given wavelength.

After selecting a desired resolution (610), an appropriate amount of magnification is determined at 620 to achieve such resolution. For example, the magnification is functionally related to the pixel pitch of the sensor array and the smallest resolvable spot size. The magnification (M) can be expressed as follows:

$$M = x/y \qquad \text{Eq. 1}$$

where: x is the pixel pitch of the sensor array; and y is the desired image resolution (minimum spot size).

So, for the above example where the pixel pitch is 10 μm and assuming a desired image resolution of 1 μm, Eq. 1 provides a biological material imaging system of power ten. That is, the lens system is configured to back-project each 10 μm pixel to the object plane and reduce respective pixels to the resolvable spot size of 1 micron.

The methodology of FIG. 7 also includes a determination of a Numerical Aperture at 630. The Numerical Aperture (NA) is determined according to well established diffraction rules that relate NA of the objective lens to the minimum resolvable spot size determined at 610 for the biological material imaging system. By way of example, the calculation of NA can be based on the following equation:

$$NA = \frac{0.5 \times \lambda}{y} \qquad \text{Eq. 2}$$

where:

λ is the wavelength of light being used in the optical system; and y is the minimum spot size (e.g., determined at 610).

Continuing with the example in which the biological material imaging system has a resolved spot size of y=1 micron, and assuming a wavelength of about 500 nm (e.g., green light), a NA=0.25 satisfies Eq. 2. It is noted that relatively inexpensive commercially available objectives of power 10 provide numerical apertures of 0.25.

It is to be understood and appreciated that the relationship between NA, wavelength and resolution represented by Eq. 2 can be expressed in different ways according to various factors that account for the behavior of objectives and condensers. Thus, the determination at 630, in accordance with an aspect of the present invention, is not limited to any particular equation but instead simply obeys known general physical laws in which NA is functionally related to the wavelength and resolution. After the lens parameters are designed according to the selected sensor (600), the corresponding optical components can be arranged to provide a biological material imaging system (640) in accordance with an aspect of the present invention.

Assume, for purposes of illustration, that the example biological material imaging system created according to the methodology of FIG. 7 is to be used for microscopy. By way of comparison, in classical microscopy, in order to image structures of a size approaching 1 micron (and below), magnifications of many hundreds usually are required. The basic reason for this is that such optics conventionally are designed for the situation when the sensor of choice is the human eye. In contrast, the methodology of FIG. 7 designs the biological material imaging system around the sensor, which affords significant performance increases at reduced cost.

In the k-space design methodology, according to an aspect of the present invention, the biological material imaging system is designed around a discrete sensor that has known fixed dimensions. As a result, the methodology provides a far more straight-forward optical system design approach to "back-project" the sensor size onto the object plane and calculate a magnification factor. A second part of the methodology helps ensure that the optics that provide the magnification have a sufficient NA to optically resolve a spot of the same dimensions as the back-projected pixel. Advantageously, a biological material imaging system designed in accordance with an aspect of the present invention can utilize custom and/or off-the-shelf components. Thus, for this example, inexpensive optics can be employed in accordance with an aspect of the present invention to obtain excellent results, but well-corrected microscope optics are relatively inexpensive. If custom-designed optics are utilized, in accordance with an aspect of the present invention, then the range of permissible magnifications and numerical apertures becomes immense, and some performance gains can be realized over the use of off-the-shelf optical components.

In accordance with the concepts described above in relation to FIGS. 1–7, a plurality of related biological material imaging applications and methods can be enabled and enhanced by the present invention. For example, these applications can include but are not limited to imaging, control, inspection, microscopy and/or other analysis.

The biological material imaging system of the present invention enables computer driven control or automated process control to obtain data from biological material samples. In this connection, a computer or processor, coupled with the biological material imaging system, contains or is coupled to a memory or data base containing images of biological material, such as diseased cells of various types. In this context, automatic designation of normal and abnormal biological material may be made. The biological material imaging system secures images from a given biological material sample, and the images are compared with images in the memory, such as images of diseased cells in the memory. In one sense, the computer/processor performs a comparison analysis of collected image data and stored image data, and based on the results of the analysis, formulates a determination of the identity of a given biological material; of the classification of a given biological material (normal/abnormal, cancerous/noncancerous, benign/malignant, infected/not infected, and the like); and/or of a condition (diagnosis).

If the computer/processor determines that a sufficient degree of similarity is present between particular images from a biological material sample and saved images (such as of diseased cells or of the same biological material), then the image is saved and data associated with the image may be generated. If the computer/processor determines that a sufficient degree of similarity is not present between particular image of a biological material sample and saved images of diseased cells/particular biological material, then the biological material sample is repositioned and additional images are compared with images in the memory. It is to be appreciated that statistical methods can be applied by the computer/processor to assist in the determination that a sufficient degree of similarity is present between particular images from a biological material sample and saved images of biological material. Any suitable correlation means, memory, operating system, analytical component, and software/hardware may be employed by the computer/processor.

Figure 8:
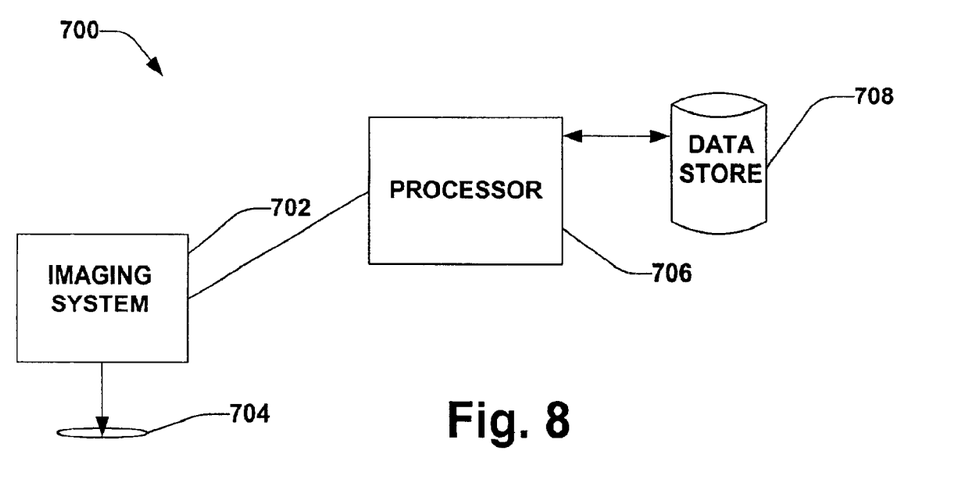
FIG. 8 is a high level schematic diagram of a biological material imaging system in accordance with one aspect of the present invention.

Referring to FIG. 8, an exemplary embodiment of an automated biological material imaging system 700 in accordance with one aspect of the present invention enabling computer driven control or automated process control to obtain data from biological material samples is shown. The imaging systems 702 described in connection with FIGS. 1–7 may be employed to capture an image of a biological material 704. The imaging system 702 is coupled to a processor 706 or computer that reads the image generated by the imaging system 702 and compares the image to a variety of images in the data store 708.

The processor 706 contains an analysis component to make the comparison. Some of the many algorithms used in image processing include convolution (on which many others are based), FFT, DCT, thinning (or skeletonisation), edge detection and contrast enhancement. These are usually implemented in software but may also use special purpose hardware for speed. FFT (fast Fourier transform) is an algorithm for computing the Fourier transform of a set of discrete data values. Given a finite set of data points, for example, a periodic sampling taken from a real-world signal, the FFT expresses the data in terms of its component frequencies. It also addresses the essentially identical inverse concerns of reconstructing a signal from the frequency data. DCT (discrete cosine transform) is technique for expressing a waveform as a weighted sum of cosines. There are a few programming languages designed for image processing, e.g. CELIP (cellular language for image processing) and VPL (visual programming language).

The data store 708 contains one or more sets of predetermined images. The images may include normal images of various biological materials and/or abnormal images of various biological materials (diseased, mutated, physically disrupted, and the like). The images stored in the data store 708 provide a basis to determine whether or not a given captured image is similar or not similar (or the degree of similarity) to the stored images. In one embodiment, the automated biological material imaging system 700 can be employed to determine if a biological material sample is normal or abnormal. For example, the automated biological material imaging system 700 can identify the presence of diseased cells, such as cancerous cells, in a biological material sample, thereby facilitating diagnosis of a given disease or condition. In another embodiment, the automated biological material imaging system 700 can diagnose any of the illnesses/diseases listed above by either identifying the presence of an illness causing biological material (such as an illness causing bacteria described above) or determining that a given biological material is infected with an illness causing entity such as a bacteria or determining that a given biological material is abnormal (cancerous).

In yet another embodiment, the automated biological material imaging system 700 can be employed to determine the identity of a biological material of unknown origin. For example, the automated biological material imaging system 700 can identify a white powder as containing anthrax. The automated biological material imaging system 700 can also facilitate processing biological material, such as performing white blood cell or red blood cell counts on samples of blood.

The computer/processor may be coupled to a controller which controls a servo motor or other means of moving the biological material sample within the object plane so that remote/hands free imaging is facilitated. That is, motors, adjusters, or other mechanical means can be employed to move the biological material sample slide within the object field of view.

Moreover, since the images of the biological material examination process are optimized for viewing from a computer screen, television, or closed circuit monitor, remote and web based viewing and control may be implemented. Real time imaging facilitates at least one of rapid diagnosis, data collection/generation, and the like.

In another embodiment, the biological material imaging system is directed to a portion of a human (such as lesion on an arm, haze on the cornea, and the like) and images formed. The images are sent to a computer/processor, which is instructed to identify the possible presence of a particular type of diseased cell (an image of which is stored in memory). Once a diseased cell is identified, the computer/processor instructs the system to remove/destroy the diseased cell, for example, using a laser, liquid nitrogen, cutting instrument, and the like.

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A biological material imaging system, comprising:
   a biological material; and
   an imaging system for imaging a portion of the biological material, the imaging system comprising:
      a sensor having one or more receptors, the one or more receptors having a receptor size parameter; and
      an image transfer medium having a diffraction limited spot size in an object field of view, the image transfer medium operative to scale the receptor size parameter in the object field of view to about the diffraction limited spot size in the object field of view.

2. The biological material imaging system of claim 1, the image transfer medium providing a k-space filter that correlates a pitch associated with the one or more receptors to a diffraction-limited spot within the object field of view.

3. The biological material imaging system of claim 2, the pitch being unit-mapped to about the size of the diffraction-limited spot within the object field of view.

4. The biological material imaging system of claim 1, the image transfer medium further comprising at least one of an aspherical lens, a multiple lens configuration, a fiber optic taper, an image conduit, and a holographic optic element.

5. The biological material imaging system of claim 1, the image transfer medium comprising a multiple lens configuration, the multiple lens configuration comprising a first lens positioned toward the object field of view and a second lens positioned toward the sensor, the first lens sized to have a focal length smaller than the second tens to provide an apparent reduction of the one or more receptors within the object field of view.

6. The biological material imaging system of claim 1, the sensor comprising at least one of digital sensor, analog sensor, Charge Coupled Device sensor, CMOS sensor, Charge Injection Device, sensor, an array sensor, and a linear scan sensor.

7. The system of claim 1, further comprising a computer and a memory to receive an output from the sensor the computer storing the output in the memory.

8. The biological material imaging system of claim 7, the computer mapping the memory to a display to enable manual analysis of an image.

9. The biological material imaging system of claim 8, the image having a depth of field of about 1 or more microns and about 50 microns or less at an Effective Resolved Magnification of about 750 times or more and about 5000 times or less.

10. The biological material imaging system of claim 8, the image having an effective resolved magnification of about 2500 times or more and about 5000 times or less, the image providing a spatial field of view of about 0.250 millimeters or less.

11. The biological material imaging system of claim 1, the image transfer medium enabling a working distance from an object plane to the image transfer medium of about 0.1 millimeters or more and about 20 millimeters or less.

12. The biological material imaging system of claim 1, the biological material is selected from the group of at least one of bacteria, virses, fungi, and cell material.

13. The biological material imaging system of claim 1, further comprising an illumination source to illuminate one or more non-luminous objects within the object field of view.

14. The biological material imaging system of claim 13, the illumination source comprises at least one of wavelength-specific lighting, broad-band lighting, continuous lighting, strobed lighting, Kohler illumination, Abbe illumination, phase-contrast illumination, darkfield illumination, brightfield illumination and Epi illumination.

15. The biological material imaging system of claim 13, the illumination source further comprising at least one of coherent light, non-coherent light, visible light and non-visible light, the non-visible light being suitably matched to a sensor adapted for non-visible light.

16. The biological material imaging system of claim 1, the biological material comprising human cells.

17. The biological material imaging system of claim 1, the biological material comprising cancerous cells.

18. The biological material imaging system of claim 1, biological material comprising bacteria.

19. The biological material imaging system of claim 1, the biological material comprising blood.

20. A method of imaging a biological material, comprising:
- positioning the biological material within an object plane of an imaging system for imaging a portion of the biological material, the imaging system comprising:
  - a sensor having one or more receptors; and
  - an image transfer medium;
- determining a pitch size between adjacent receptors on the sensor;
- determining a resolvable object size in an object field of view;
- scaling the pitch size through the image transfer medium to correspond with the resolvable object size in the object field of view; and
- forming an image of the biological material.

21. The method of claim 20, the imaging system further comprising a computer display for viewing the image.

22. The method of claim 20, the biological material comprising human cells.

23. The method of claim 20, the biological material comprising eukaryotic cells.

24. The method of claim 20, the biological material comprising bacteria.

25. The method of claim 20, the biological material comprising lymphocytes.

26. A method of imaging a biological material, comprising:
- positioning a first lens toward the biological material in an object field of view;
- positioning a second lens toward a sensor having one or more receptors, the first lens and second lens having a diffraction limited spot size in the object field of view;
- sizing the first lens to have a focal length smaller than a focal length associated with the second lens to provide an apparent size reduction of the one or more receptors within the object field of view to about the diffraction limited spot size; and
- forming an image of the biological material.

27. A biological material imaging system, comprising:
- a biological material; and
- an imaging system for imaging the biological material, the imaging system comprising:
  - a sensor comprising pixels, the pixels having a size parameter; and
  - an optical system having a diffraction limited spot size in an object field of view, the optical system operative to scale the size parameter of the pixels in the object field of view to about the diffraction limited spot size in the object field of view, the optical system comprising a first lens positioned toward the object field of view and a second lens positioned toward the sensor, the first lens sized to have a focal length smaller than the second lens.

28. The biological material imaging system of claim 27, the biological material comprising at least one selected from the group consisting of human cells, non-human animal cells, plant cells, and synthetic cells.

29. The biological material imaging system of claim 27, the biological material comprising human cells.

30. The biological material imaging system of claim 27, the biological material comprising cancerous cells.

31. The biological material imaging system of claim 27, the biological material comprising bacteria.

* * * * *

UNITED STATES PATENT AND TRADEMARK OFFICE
CERTIFICATE OF CORRECTION

PATENT NO. : 6,884,983 B2
DATED : April 26, 2005
INVENTOR(S) : Fein et al.

It is certified that error appears in the above-identified patent and that said Letters Patent is hereby corrected as shown below:

<u>Title page,</u>
Item [73], Assignee, please add the following:
-- Himanshu S. Amin, Twinsburg, Ohio
  Daniel B. Bortnick, Mentor, Ohio
  Gregory Turocy, Westlake, Ohio --

Signed and Sealed this

Twenty-eighth Day of June, 2005

JON W. DUDAS
*Director of the United States Patent and Trademark Office*